(12) United States Patent
Krkljus et al.

(10) Patent No.: US 10,026,954 B2
(45) Date of Patent: Jul. 17, 2018

(54) ELECTRODE MATERIALS FOR LITHIUM ION BATTERIES

(71) Applicant: BASF SE, Ludwigshafen (DE)

(72) Inventors: Ivana Krkljus, Ludwigshafen (DE); Aleksei Volkov, Ludwigshafen (DE); Carsten Sueling, Frankenthal (DE)

(73) Assignee: BASF SE, Ludwigshafen (DE)

( * ) Notice: Subject to any disclaimer, the term of this patent is extended or adjusted under 35 U.S.C. 154(b) by 410 days.

(21) Appl. No.: 14/770,147

(22) PCT Filed: Jun. 30, 2014

(86) PCT No.: PCT/EP2014/063874
§ 371 (c)(1),
(2) Date: Aug. 25, 2015

(87) PCT Pub. No.: WO2015/003947
PCT Pub. Date: Jan. 15, 2015

(65) Prior Publication Data
US 2016/0006023 A1      Jan. 7, 2016

(30) Foreign Application Priority Data
Jul. 8, 2013 (EP) .................... 13175541

(51) Int. Cl.
| | | |
|---|---|---|
| *H01M 4/36* | (2006.01) | |
| *H01M 4/131* | (2010.01) | |
| *H01M 4/136* | (2010.01) | |
| *H01M 4/505* | (2010.01) | |
| *H01M 4/525* | (2010.01) | |
| *H01M 4/58* | (2010.01) | |
| *H01M 4/62* | (2006.01) | |
| *H01M 10/0525* | (2010.01) | |

(52) U.S. Cl.
CPC ........... *H01M 4/364* (2013.01); *H01M 4/131* (2013.01); *H01M 4/136* (2013.01); *H01M 4/505* (2013.01); *H01M 4/525* (2013.01); *H01M 4/5825* (2013.01); *H01M 4/625* (2013.01); *H01M 10/0525* (2013.01); *H01M 2220/20* (2013.01)

(58) Field of Classification Search
CPC ...... H01M 4/364; H01M 4/131; H01M 4/136; H01M 4/505; H01M 4/525; H01M 4/5825; H01M 4/625; H01M 10/0525; H01M 2220/20
See application file for complete search history.

(56) References Cited

U.S. PATENT DOCUMENTS

| | | |
|---|---|---|
| 2002/0106562 A1 | 8/2002 | Sato et al. |
| 2008/0254368 A1 | 10/2008 | Ooyama et al. |
| 2010/0261060 A1 | 10/2010 | Choy et al. |
| 2012/0107695 A1 | 5/2012 | Lee et al. |
| 2012/0189891 A1 | 7/2012 | Ooyama et al. |

FOREIGN PATENT DOCUMENTS

| | | |
|---|---|---|
| CN | 1826291 | 8/2006 |
| EP | 1 198 019 A2 | 4/2002 |
| EP | 2 360 118 A2 | 8/2011 |
| EP | 2 565 966 A2 | 3/2013 |
| EP | 2 571 082 A2 | 3/2013 |
| WO | WO 2008/088180 A1 | 7/2008 |
| WO | WO 2011/136549 A2 | 11/2011 |
| WO | WO 2011/142554 A2 | 11/2011 |

OTHER PUBLICATIONS

International Search Report dated Jul. 23, 2014 in PCT/EP2014/063874.
Office Action dated Mar. 21, 2018, in Chinese Patent Application No. 201480038886.7.

*Primary Examiner* — Laura Weiner
(74) *Attorney, Agent, or Firm* — Oblon, McClelland, Maier & Neustadt, L.L.P.

(57) ABSTRACT

Electrode materials comprising (a) at least one component of general formula (I) $Li_{(1+x)}[Ni_aCo_bMn_cM1_d]_{(1-x)}O_2$ (I) the integers being defined as follows: x is in the range of from 0.01 to 0.05, a is in the range of from 0.3 to 0.6, b is in the range of from zero to 0.35, c is in the range of from 0.2 to 0.6, d is in the range of from zero to 0.05, $a+b+c+d=1$ $M^1$ is at least one metal selected from Ca, Zn, Fe, Ti, Ba, Al, (b) at least one component of general formula (II) $LiFe_{(1-y)}M^2_yPO_4\cdot m$ lithium phosphate (II) y is in the range of from zero to 0.8 $M^2$ is at least one element selected from Co, Mn, Ni, V, Mg, Nd, Zn, and Y, m is selected from 0.01 to 0.15 (c) carbon in electrically conductive modification.

10 Claims, No Drawings

ELECTRODE MATERIALS FOR LITHIUM ION BATTERIES

The present invention is directed towards electrode materials comprising
(a) at least one component of general formula (I)

$$Li_{(1+x)}[Ni_aCo_bMn_cM^1_d]_{(1-x)}O_2 \quad (I)$$

the integers being defined as follows:
x is in the range of from 0.01 to 0.05,
a is in the range of from 0.3 to 0.6,
b is in the range of from zero to 0.35,
c is in the range of from 0.2 to 0.6,
d is in the range of from zero to 0.05,
a+b+c+d=1
$M^1$ is at least one metal selected from Ca, Zn, Fe, Ti, Ba, Al,
(b) at least one component of general formula (II)

$$LiFe_{(1-y)}M^2_yPO_4 \cdot m \text{ lithium phosphate} \quad (II)$$

y is in the range of from zero to 0.8
$M^2$ is at least one element selected from Co, Mn, Ni, V, Mg, Nd, Zn, and Y,
m is selected from 0.01 to 0.15,
(c) carbon in electrically conductive modification.

Furthermore, the present invention is directed towards a method for making inventive electrode materials. Furthermore, the present invention is directed towards the use of inventive electrode materials.

Lithium ion secondary batteries are modern devices for storing energy. Many application fields have been and are contemplated, from small devices such as mobile phones and laptop computers through car batteries and other batteries for electromobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Various authors have studied the influence of the stoichiometry of lithium and transition metals in lithium iron phosphate. D.-H. Kim et al., *J. Power Sources* 2006, 159, 237 have reported on impurities of lithium phosphate in lithium iron phosphate, and they disclose that samples with excess iron have more capacity and better rate capability. P. Axmann et al., *Chem. Mater.* 2009, 21, 1636 have concluded that $Li_3PO_4$ in lithium iron phosphate can act as inert mass.

In EP 2 565 966 (WO 2011/136549) and EP 2 571 082 (WO 2011/142554), lithiated nickel-cobalt-manganese oxides have been disclosed that are coated with $Li_3PO_4$. The extra step of coating is tedious.

In WO 2008/088180, certain hybride electrode materials have been disclosed that comprise two lithium containing composite oxides, one being preferably a lithium iron phosphate and the other one being a lithium transition metal oxide such as $LiCoO_2$ or $LiNi_{1/3}Co_{1/3}Mn_{1/3}O_2$. Preferably, the $LiCoO_2$ or $LiNi_{1/3}Co_{1/3}Mn_{1/3}O_2$, respectively, is surface-coated with lithium iron phosphate. The materials disclosed exhibit an improved safety performance.

However, they still leave room for improvement with respect to their capacity at various temperatures, especially at temperatures of 45° C. or above, in particular to the capacity loss at such high temperatures. Furthermore, the cycle stability and C rate performance at higher temperatures such as 45° C. or more may be improved as well.

It was therefore an objective of the present invention to provide batteries with an improved capacity at 45° C. or higher, in particular to the capacity loss at such high temperatures. It was furthermore an objective to provide a process for making batteries with an improved capacity at 45° C. or higher in particular to the capacity loss at such high temperatures.

Accordingly, the materials defined at the outset have been found, hereinafter also being referred to as inventive electrode materials or electrode materials according to the invention.

Inventive electrode materials comprise at least three components, components (a), (b) and (c). Said three components will be described in more detail below.

In a preferred embodiment, component (a) is characterized by the general formula (I)

$$Li_{(1+x)}[Ni_aCo_bMn_cM^1_d]_{(1-x)}O_2 \quad (I)$$

the integers being defined as follows:
x is in the range of from 0.01 to 0.07, preferably up to 0.05, even more preferably in the range of from 0.02 to 0.04,
a is in the range of from 0.3 to 0.6, preferably from 0.32 to 0.50,
b is in the range of from zero to 0.35, preferably from 0.20 to 0.33,
c is in the range of from 0.2 to 0.6, preferably from 0.30 to 0.40,
d is in the range of from zero to 0.05, preferably d is zero.
a+b+c+d=1
$M^1$ is at least one metal selected from Ca, Zn, Fe, Ti, Ba, Al, and in embodiments in which d≠zero, Al and Ti are preferred for $M^1$.

In one embodiment of the present invention, above general formula (I) is referring to the electrically neutral state of component (a). Preferably, component (a) is one compound of the above general formula (I).

In one embodiment of the present invention, up to 5 mol-% of oxide ions in component (a) may be replaced by fluoride. In other embodiments, component (a) is essentially fluorine-free, that is, fluorine is below 100 ppm, referring to oxide, or even below level of experimental detection. The content of fluoride may be determined by gravimetric analysis, for example as $CaF_2$, or preferably by ion chromatography.

The synthesis of component (a) can be performed in two steps. In a first step, a precursor is being formed, for example by co-precipitation of water-insoluble salts of nickel, manganese and, optionally, of cobalt and/or of $M^1$, such as carbonates, hydroxides, hydroxides-carbonates, oxides and oxyhydroxides. In a second step, the precursor is mixed with a lithium salt such as LiOH or $Li_2CO_3$ and said mixture is calcined (fired). In the context of the present invention, said precursor is mixed with a molar excess of lithium compound, referring to the sum of the transition metals including $M^1$. Water-insoluble in the context of synthesis of component (a) means that the respective precursor has a solubility of 0.1 g or less per liter of distilled water at a pH value of 7 and a temperature of 20° C.

Component (b) is characterized by the general formula $$LiFe_{(1-y)}M^2_yPO_4 \cdot m \text{ lithium phosphate} \quad (II)$$

y is in the range of from zero to 0.8, preferably zero to 0.2,
$M^2$ is at least one element selected from Ti, Co, Mn, Ni, V, Mg, Nd, Zn and Y, and in embodiments in which y≠zero, $M^2$ being selected from Ti, Co and Mn is preferred.
m is an integer that is selected from 0.01 to 0.15, preferred from 0.02 to 0.10.

In one embodiment of the present invention, above general formula (II) is referring to the electrically neutral state of component (b).

In one embodiment of the present invention, lithium phosphate is selected from $Li_3PO_4$, $LiPO_3$ and $Li_4P_2O_7$ or combinations of at least two thereof, such as combinations of $Li_3PO_4$ and $Li_4P_2O_7$.

In one embodiment of the present invention, component (b) is not homogeneous in its composition, and lithium phosphate is distributed unevenly over component (b). Preferably, lithium phosphate is mainly or exclusively at the boundaries of primary particles of $LiFe_{(1-y)}M^2{}_yPO_4$, said lithium phosphate being preferably not incorporated into the structure of $LiFe_{(1-y)}M^2{}_yPO_4$ but as a secondary phase.

Many elements are ubiquitous. For example, sodium, copper and chloride are detectable in certain very small proportions in virtually all inorganic materials. In the context of the present invention, proportions of less than 0.1% by weight of cations or anions are disregarded. A compound of formula (I) or (II) which comprises less than 0.1% by weight of sodium is thus considered to be sodium-free in the context of the present invention. Correspondingly, a compound of formula (I) or (II) which comprises less than 0.1% by weight of sulfate ions is considered to be sulfate-free in the context of the present invention.

Without wishing to be bound by any theory, it can be assumed that the additional lithium phosphate compound facilitates the transfer of lithium ions across the grain boundaries, in particular at high temperatures.

Without wishing to be bound by any theory, at higher temperature such as 45° C. or even 60° C., lithium phosphate may serve as an extra reservoir for lithium ions, especially for component (a).

Component (b) can be manufactured according to various methods, for example by solid state methods or by precipitation methods. In one embodiment, component (b) can be made by a gelling method. Gelling methods can enable the control of the structure of a material on a nanometer scale from the earliest stages of syntheses. An aqueous solution containing a water-soluble iron(III) salt such as $Fe(NO_3)_3$ or $Fe_2(SO_4)_3$, a Li salt such as LiOH or $Li_2CO_3$, a phosphate source such as $NH_4H_2PO_4$ and a reducing agent such as ascorbic acid and, optionally, at least one water-soluble compound of $M^2$, such as $Co(NO_3)_2$, $Mn(NO_3)_2$, $Ni(NO_3)_2$, $VO(NO_3)_2$, $VOCl_2$, $VOCl_3$, $ZnCl_2$, $Zn(NO_3)_2$, $Mg(NO_3)_2$, and the like, is being gelled by evaporation of the water. A xerogel will be obtained that is then dried at temperatures of 300 to 400° C., then mechanically treated and again dried at 450 to 550° C., followed by calcination at 700 to 825° C., preferably under an atmosphere of hydrogen. The reducing agent, preferably ascorbic acid, can also serve as carbon source.

In another embodiment, component (b) can be synthesized under hydrothermal conditions starting from a water-insoluble iron compound as source of iron. In such an embodiment, an aqueous slurry of a water-insoluble iron(III) compound such as $Fe_2O_3$, $Fe_3O_4$, FeOOH, or $Fe(OH)_3$ is mixed with at least one reducing agent such as hydrazine, hydrazine hydrate, hydrazine sulphate, hydroxyl amine, a carbon-based reducing agent such as a primary or secondary alcohol, a reducing sugar, or ascorbic acid, or a reductive phosphorous compound such as $H_3PO_3$ or an ammonium salt thereof, is being prepared. A carbon source such as graphite, soot or active carbon can be added. In case the reducing agent does not bear any phosphorous atom a phosphate source is added, such as phosphoric acid, ammonium phosphate or ammonium (di)hydrogen phosphate, especially $(NH_4)_2HPO_4$ or $NH_4H_2PO_4$. Combinations of $H_3PO_3$ or an ammonium salt thereof and a phosphate source are feasible as well. The slurry so obtained is then reacted at a temperature in the range of from 100 to 350° C. in the presence of a lithium compound such as $Li_2CO_3$, LiOH or the like, preferably for a period of time in the range of from 1 to 24 hours. The reaction can be performed at a pressure in the range of from 1 to 100 bar. The water is then removed, followed by calcination, for example at 700 to 900° C., preferably under an atmosphere of hydrogen.

In another embodiment, component (b) can be synthesized under hydrothermal conditions starting from a water-soluble iron compound as source of iron. In such an embodiment, an aqueous solution of a water soluble iron(II) compound such as $FeSO_4.7H_2O$ or of a water soluble iron(III) compound such as $Fe_2(SO_4)_3.7H_2O$ is mixed with a Li compound, such as $LiOH.H_2O$, and with a phosphorous compound such as $H_3PO_4$, $(NH_4)_3PO_4.3H_2O$, $NH_4H_2PO_4$, or $(NH_4)_2HPO_4$, with or without adding any reducing agent, such as ascorbic acid, and/or with or without adding polyethylene glycol (PEG). The solution so obtained is then processed hydrothermally at 120 to 190° C., preferably above 175° C. After the hydrothermal treatment, in most cases the powder so obtained will be treated at higher temperature, for example in the range of from 600 to 800° C.

In another embodiment, component (b) can be synthesized in a sol-gel process. In such an embodiment, a solution of a water-soluble iron(II) compound such as $Fe(acetate)_2$, a lithium compound such as $Li_2CO_3$ or lithium acetate, and $H_3PO_4$ in at least one organic solvent such as DMF (N,N-dimethyl formamide) is being prepared. The organic solvent(s) are then removed, preferably by evaporation. The residue is then heated stepwise to 700° C. and then calcined at temperatures in the range of from 750 to 850° C. under a reducing atmosphere, for example under hydrogen.

In another embodiment, component (b) can be synthesized from oxalate, such as iron oxalate. Iron oxalate can be used in a solid state process, by preparing a stoichiometric mixture of $FeC_2O_4.2H_2O$ with a lithium compound such as $Li_2CO_3$ or $LiOH.2H_2O$, and with $NH_4H_2PO_4$, in the presence of alcohol, by ballmilling or by using high shear mixer. A carbon source such as polyvinyl alcohol (PVA) or glucose is added and the resultant material is sintered, for example at 600 to 800° C. under reducing atmosphere.

In another embodiment, iron oxalate can be employed for the soft chemistry-rheological phase reaction method, wherein $FeC_2O_4.2H_2O$ is mixed with a lithium compound such as $Li_2CO_3$ and with a phosphorous compound such as $NH_4H_2PO_4$ by thoroughly grinding, adding a polymer such as polyethylene glycol as carbon source. The precursor so obtained will then be heated in an inert atmosphere to 400 to 800° C.

In another embodiment, component (b) can be synthesized from blends of iron phosphate, without or preferably with water of crystallization, and a lithium salt, preferably $Li_2CO_3$, by a solid state reaction in the range of from 650 to 800° C.

In each of the above embodiments, a molar excess of lithium salt with respect to iron or the sum of iron and $M^2$ will be applied.

In formulae of the above compounds, water of crystallization has been neglected.

Water-soluble in the context of starting materials for the synthesis of component (b) refers to compounds that exhibit a solubility of 10 g/l or more in distilled water at 20° C. Water-insoluble in the context of starting materials for the synthesis of component (b) refers to compounds that exhibit a solubility of 0.1 g/l or less in distilled water at 20° C.

Electrode materials according to the present invention further contain carbon in electrically conductive modification, in brief also referred to as carbon (c). Carbon (c) can be selected from soot, active carbon, carbon nanotubes, graphene, and graphite. Carbon (c) can be added as such during preparation of electrode materials according to the invention, or it can be manufactured in situ together with component (a) or preferably together with component (b), for example by adding an organic compound and calcining any precursor of component (b) together with said organic compound. Polymeric organic compound are preferred examples of organic compounds that may serve as a carbon source.

In one embodiment of the present invention, the weight ratio of component (a) to component (b) is in the range of from 30:70 to 97.5:2.5, preferably in the range of from 80:20 to 95:5 and more preferably of from 85:15 to 95:5. Especially at temperatures over 60° C., the capacity after 30 or more cycles becomes too low if the weight ratio of component (a) to component (b) drops below 30 to 70.

In one embodiment of the present invention, the amount of carbon (c) is in the range of 1 to 8% by weight, referring to component (b), preferably at least 2% by weight.

In one embodiment of the present invention, the surface (BET) of component (b) is in the range of from 5 to 35 m$^2$/g, preferably 7 to 15 m$^2$/g.

In one embodiment of the present invention, the surface (BET) of component (a) is in the range of from 0.2 to 10 m$^2$/g, preferably from 0.3 to 1 m$^2$/g. The surface (BET) can be determined by nitrogen absorption, for example according to DIN 66131.

In one embodiment of the present invention, primary particles of component (a) have an average diameter in the range from 1 to 2000 nm, preferably from 10 to 1000 nm, particularly preferably from 50 to 500 nm. The average primary particle diameter can, for example, be determined by SEM or TEM.

In one embodiment of the present invention, the particle diameter (D50) of secondary particles of component (a) is in the range from 6 to 16 µm, especially 7 to 9 µm. The mean particle diameter (D50) in the context of the present invention refers to the median of the volume-based particle diameter, as can be determined, for example, by light scattering, especially by LASER scattering technologies, for example at a pressure in the range of from 0.5 to 3 bar.

In one embodiment of the present invention, primary particles of component (b) have an average diameter in the range from 1 to 2000 nm, preferably from 10 to 1000 nm, particularly preferably from 50 to 500 nm, even more preferably 80 to 270 nm. The average primary particle diameter can, for example, be determined by SEM or TEM, or by XRD methods. Such XRD methods preferably use the Scherrer Equation where the peak width is inversely proportional to crystallite size.

In one embodiment of the present invention, component (b) is in the form of agglomerates of primary particles, such agglomerates having an average diameter (d50) in the range of from 1 µm to 10 µm, preferably 2 to 5 µm, even more preferably 4 to 5 µm.

In one embodiment of the present invention, component (b) is coated by a layer of carbon (c) between the primary crystallites (primary particles), and on the surface of the secondary particles.

In one embodiment of the present invention, carbon (c) has an average primary particle diameter in the range from 1 to 500 nm, preferably in the range from 2 to 100 nm, particularly preferably in the range from 2 to 50 nm, very particularly preferably in the range from 2 to 4 nm or less.

In one embodiment of the present invention, component (a) according to formula (I) is provided in the form of a gradient material. A gradient material in the context of the present invention refers to particles, in particular to secondary particles, in which the transition metal contents of at least two transition metals are not constant over the radius of the diameter of the particle. Preferably, the contents of manganese is higher in the shell of a particle by 10 to 20 mole%, referring to the sum of Ni, Co, Mn and—if applicable—M$^1$. Preferably, the contents of nickel is higher in the core of a particle by 10 to 20 mole % compared to the shell of the respective particle, referring to the sum of Ni, Co, Mn and of M$^1$ if applicable. In other embodiments, component (a) according to formula (I) has a uniform distribution of the transition metal ion over the diameter of the respective particles.

The materials according to the present invention may in particular serve as cathode materials.

A further aspect of the present invention refers to cathodes comprising at least one electrode material according to the present invention. They are particularly useful for lithium ion batteries. Lithium ion batteries comprising at least one electrode according to the present invention exhibit a very good discharge and cycling behavior, in particular at high temperatures (45° C. or higher, for example up to 60° C.) in particular with respect to the capacity loss, and a good safety behavior at high temperatures such as 60° C. or more. Preferably, also the cycle stability and the C-rate capacity behavior are improved. Cathodes comprising at least one electrode material according to the present invention are hereinafter also referred to as inventive cathodes or cathodes according to the present invention.

Cathodes according to the present invention can comprise further components. They can comprise a current collector, such as, but not limited to, an aluminum foil. They can further comprise a binder (d).

Suitable binders (d) are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example a-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (d) is polybutadiene.

Other suitable binders (d) are selected from polyethylene oxide (PEO), cellulose, carboxymethylcellulose, polyimides and polyvinyl alcohol.

In one embodiment of the present invention, binder (d) is selected from those (co)polymers which have an average molecular weight $M_w$ in the range from 50,000 to 1,000,000 g/mol, preferably to 500,000 g/mol.

Binder (d) may be cross-linked or non-cross-linked (co)polymers.

In a particularly preferred embodiment of the present invention, binder (d) is selected from halo-genated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (d) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s) (d), referring to the sum of component (a), component (b) and carbon (c). In other embodiments, inventive cathodes may comprise 0.1 up to less than 1% by weight of binder(s) (d).

A further aspect of the present invention is a battery, containing
(A) at least one cathode comprising component (a), component (b), carbon (c), and binder (d)
(B) at least one anode, and
(C) at least one electrolyte.

Embodiments of cathode (A) have been described above in detail.

Anode (B) may contain at least one anode active material, such as carbon (graphite), $TiO_2$, lithium titanium oxide, silicon or tin. Anode (B) may additionally contain a current collector, for example a metal foil such as a copper foil.

Electrolyte (C) may comprise at least one non-aqueous solvent, at least one electrolyte salt and, optionally, additives.

Nonaqueous solvents for electrolyte (C) can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (III) and (IV)

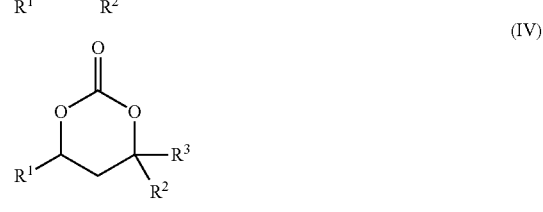

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (V).

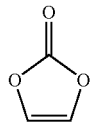

(V)

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators (D) by means of which the electrodes are mechanically separated. Suitable separators (D) are polymer films, in particular porous polymer films, which are unreactive toward metallic lithium. Particularly suitable materials for separators (D) are polyolefins, in particular film-forming porous polyethylene and film-forming porous polypropylene.

Separators (D) composed of polyolefin, in particular polyethylene or polypropylene, can have a porosity in the range from 35 to 45%. Suitable pore diameters are, for example, in the range from 30 to 500 nm.

In another embodiment of the present invention, separators (D) can be selected from among PET nonwovens filled with inorganic particles. Such separators can have a porosity in the range from 40 to 55%. Suitable pore diameters are, for example, in the range from 80 to 750 nm.

Batteries according to the invention can further comprise a housing which can have any shape, for example cuboidal or the shape of a cylindrical disk or a cylindrical can. In one variant, a metal foil configured as a pouch is used as housing.

Batteries according to the invention provide a very good discharge and cycling behavior, in particular at high temperatures (45° C. or higher, for example up to 60° C.) in particular with respect to the capacity loss.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contain a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

EXAMPLES

General remarks: % refer to % by weight unless expressly noted otherwise.

Mixed transition metal oxide/hydroxide precursors were hydroxides such as $Ni_{0.33}Co_{0.33}Mn_{0.33}(OH)_2$ that had been dried under air for some hours. In the course of drying, some of the transition metal had oxidized, and some of the counterions were oxide instead of hydroxide. In the below examples, the precursors are denoted as hydroxides regardless of such oxidation.

$Nm^3$ refers to $m^3$ under normal conditions (ambient temperature/1 bar).

LiOH was used as $LiOH.H_2O$. The amount in the example refers to LiOH without the water.

I. Syntheses of Cathode Active Materials
I.1 Synthesis of Compounds (I)
I.1.1 Synthesis of Compound (I.1)

A precursor $Ni_{0.33}Co_{0.33}Mn_{0.33}(OH)_2$, spherical particles, average particle diameter 10 μm, was mixed with finely milled $Li_2CO_3$. The molar ratio of lithium ($Li_2CO_3$) to the sum of the transition metals in the $Ni_{0.33}Co_{0.33}Mn_{0.33}(OH)_2$ was 1.11. An amount of 40 g of the mixture so obtained was calcined in a box furnace, in rectangular saggers made from sintered aluminum oxide. The calcination was performed under air, with the heating rate being 3 K/min. The calcination temperature program was as follows: heat to 350° C., keep at 350° C. for 4 hours, heat to 675° C., keep at 675° C. for 4 hours, heat to 900° C., keep at 900° C. for 6 hours, then cool to room temperature. After cooling, the compound of formula (I.1)

$$Li_{1.06}[Ni_{0.33}Co_{0.33}Mn_{0.33}]_{0.94}O_2 \quad (I.1)$$

so obtained was grinded in a mortar. The ground compound (I.1) was sieved with a sieve having 32 μm mesh size. An amount of 30 g of particles of compound (I.1) with a diameter smaller than 32 μm were collected.

I.1.2 Synthesis of Compound (I.2)

A precursor $Ni_{0.4}Co_{0.2}Mn_{0.4}(OH)_2$, spherical particles, average particle diameter 10 μm, was mixed with finely milled $Li_2CO_3$. The molar ratio of lithium ($Li_2CO_3$) to the sum of the transition metals in the $Ni_{0.4}Co_{0.2}Mn_{0.4}(OH)_2$ was 1.13. An amount of 40 g of the mixture so obtained was calcined in a box furnace, in rectangular saggers made from sintered aluminum oxide. The calcination was performed under air, with the heating rate being 3 K/min. The calcination temperature program was as follows: heat to 350° C., keep at 350° C. for 4 hours, heat to 675° C., keep at 675° C. for 4 hours, heat to 925° C., keep at 925° C. for 6 hours, then cool to room temperature. After cooling, the compound of formula (I.2)

$$Li_{1.07}[Ni_{0.4}Co_{0.2}Mn_{0.4}]_{0.93}O_2 \quad (I.2)$$

so obtained was grinded in a mortar. The ground compound (I.2) was sieved with a sieve having 32 μm mesh size. An amount of 30 g of particles of compound (I.2) with a diameter smaller than 32 μm were collected.

I.2 Synthesis of Components According to Formula (II)
I.2.1 Synthesis of Compound (II.1)
The following ingredients were used:
80.9 g LiOH (3.38 mol)
280.8 g α-FeOOH (3.16 mol)

190.6 g 85% by weight aqueous solution of $H_3PO_4$ (1.63 mol)
134.2 g (1.6 mol) $H_3PO_3$ (98%)
46.6 g starch
46.6 g lactose A 6-l-reactor equipped with mixer and heater was charged with 4,600 g of $H_2O$. The water was heated to temperature of 76° C. Then addition of the ingredients was started. First, the LiOH was added and dissolved within 20 min. Due to exothermic reaction the solution temperature rose to 80.5° C. Then the α-FeOOH was added and stirred for another 20 min. Then, $H_3PO_4$ and $H_3PO_3$ were added. 20 minutes later, starch and lactose were added in powder form. The temperature of the yellow slurry so obtained was 87° C. Then, 500 g of $H_2O$ were added. The slurry so obtained was stirred for 21 hours at 85° C.

Then, the solid was isolated by spray-drying. The suspension prepared in the above step was spray-dried using $N_2$ (25 $Nm^3/h$) as the drying gas, applying the following spray-drying parameters:
$T_{in}$ 295° C.-298° C.
$T_{out}$ 135° C.-143° C.
Slurry feed: 724.1 g/h After spray-drying, 122 g of a yellow spray-powder were obtained.

60 g of the spray-powder obtained above were calcined in a rotary quartz-bulb. The rotary bulb was rotating with a speed of 10 rpm. The spray-powder sample was heated from ambient temperature to a temperature of 700° C., with a heating rate of 11.33° C./min. Finally, the material was calcined at a temperature of 700° C. for 1 hour under a stream of $N_2$ flow (16 NL/h). Then, the black material (compound (I.1)) so obtained was cooled down to room temperature.

Compound (II.1) of stoichiometry $LiFePO_4 \cdot 0.023 Li_3PO_4$ was sieved to <50 μm. It contained about 3.6% by weight of carbon. The $Li_3PO_4$ was located at the grain boundaries of the primary particles of $LiFePO_4$.

I.2.2 Synthesis of a Lithium Iron Phosphate for Comparative Purposes

The following ingredients were used:
75.6 g LiOH (3.16 mol)
280.8 g α-FeOOH (3.16 mol)
182.2 g 85% by weight aqueous solution of $H_3PO_4$ (1.58 mol)
134.2 g $H_3PO_3$ (98%)
46.6 g starch
46.6 g lactose A 6 l reactor equipped with mixer and heater was charged with 4,600 g of $H_2O$. The water was heated to temperature of 76° C. Then addition of the ingredients was started. First, the LiOH was added and dissolved within 20 min. Due to exothermic reaction the solution temperature rose to 80.5° C. Then α-FeOOH was added and stirred for another 20 min. Then, $H_3PO_4$ and $H_3PO_3$ were added. 20 minutes later, starch and lactose were added in powder form. The temperature of the yellow slurry so obtained was 87° C. Then, 500 g of $H_2O$ were added. The slurry obtained was stirred for more than 21 hours at 85° C.

Then, the solid was isolated by spray-drying. The suspension prepared in the above step was spray-dried using $N_2$ (25 $Nm^3/h$) as the drying gas, applying the following spray-drying parameters:
$T_{in}$ 295° C.-298° C.
$T_{out}$ 135° C.-143° C.
Slurry feed: 724.1 g/h After spray-drying, 122 g of a yellow spray-powder were obtained.

60 g of the spray-powder obtained above were calcined in a rotary quarz-bulb. The rotary bulb was rotating with a speed of 10 rpm. The spray-powder sample was heated from ambient temperature to a temperature of 700° C., with a heating rate of 11.33 ° C./min. Finally, the material was calcined at a temperature of 700° C. for 1 hour under a stream of $N_2$ flow (16 NL/h). Then, the black material (compound (II.2)) so obtained was cooled down to room temperature. Comparative compound C-(II.2) of the stoichiometry $LiFePO_4$ was obtained, without $Li_3PO_4$. It was sieved to <50 μm. It contained about 3.5% by weight of carbon.

II. Manufacture of Cathodes and Batteries According to the Invention, and of Comparative Cathodes and Batteries II.1 Manufacture of Cathodes and Batteries According to the Invention Four mixtures of compounds (a) and (b) were prepared:
80 g weight of compound (I.1) were blended in a ball-mill with 20 g of compound (II.1) to yield inventive cathode active material CAM.1.
80 g weight of compound (I.1) were blended in a ball-mill with 20 g of comparative compound C-(II.2) to yield comparative cathode active material C-CAM.2.
80 g weight of compound (I.2) were blended in a ball-mill with 20 g of compound (II.1) to yield inventive cathode active material CAM.3.
80 g weight of compound (I.2) were blended in a ball-mill with 20 g of comparative compound C-(II.2) to yield comparative cathode active material C-CAM.4.

Production of Full Cells:

To produce a cathode (A.1), the following ingredients were blended with one another:
93 g of CAM.1
3 g polyvinylidene difluoride, (d.1) ("PVdF"), commercially available as Kynar Flex® 2801 from Arkema Group,
2.5 g carbon black, (c.1), BET surface area of 62 $m^2/g$, commercially available as "Super C 65L" from Timcal,
1.5 g graphite, (c.2), commercially available as KS6 from Timcal.

While stirring, a sufficient amount of N-methylpyrrolidone (NMP) was added and the mixture was stirred with an Ultraturrax until a stiff, lump-free paste had been obtained.

Cathodes were prepared as follows: On a 30 μm thick aluminum foil the paste was applied with the 15 μm doctor blade. The loading after drying was 2.0 $mAh/cm^2$. The loaded foil was dried for 16 hours in a vacuum oven at 105° C. After cooling to room temperature in a hood, disc-shaped cathodes were punched out of the foil. The cathode discs were then weighed and introduced into an argon glove box, where they were again vacuum-dried. Then, electrochemical cells with the prepared discs were assembled.

Electrochemical testing was conducted in "TC2" cells. The electrolyte (C.1) used was a 1 M solution of $LiPF_6$ in ethyl methyl carbonate/ethylene carbonate (volume ratio 1:1).

Separator (D.1): glass fiber. Anode (B.1): graphite. Potential range of the cell: 2.70 V-4.2 V.

Inventive electrochemical cell (BAT.1) was obtained.

II.2 Manufacture of Cathodes and Electrochemical Cells According to the Invention, and of Comparative Cathodes and Electrochemical Cells For comparative purposes, the above experiment was repeated but inventive (CAM.1) was replaced by an equal amount of C-CAM.2.

Comparative electrochemical cell C-(BAT.2) was obtained.

When the above experiment is being repeated but inventive (CAM.1) is replaced by an equal amount of CAM.3, inventive electrochemical cell (BAT.3) is obtained.

When the above experiment is being repeated but inventive (CAM.1) is replaced by an equal amount of C-CAM.4, comparative electrochemical cell (BAT.4) is obtained.

III. Testing of Electrochemical Cell

Electrochemical cells according to the invention and comparative electrochemical cells were each subjected to the following cycling program: Potential range of the cell: 2.70 V-4.2 V., 0.1 C (first and second cycles), 0.5 C (from the third cycle). 1 C=150 mA/g. Temperature: 60° C.

The loss of capacity in full cells according to Table 1 was calculated as follows: the difference in the average capacity after 60 cycles and after 2 cycles, divided by the average capacity after 60 cycles and multiplied by 100 gives the loss of capacity ("fading").

TABLE 1

Results of the loss of capacity in analyses in full cells after 60 cycles:

| electrochemical cell | Loss of capacity [%] |
|---|---|
| (BAT.1) | 4 |
| C-(BAT.2) | 6 |

TABLE 1a

Results of the loss of capacity in analyses in full cells after 100 cycles:

| electrochemical cell | Loss of capacity [%] |
|---|---|
| (BAT.1) | 6.9 |
| C-(BAT.2) | 9.5 |

At ambient temperature as well, electrochemical cells according to the invention show an advantage over comparative electrochemical cells.

The invention claimed is:

1. A cathode material comprising:
(a) at least one component of general formula (I)

$$Li_{(1+x)}[Ni_aCo_bMn_cM^1_d]_{(1-x)}O_2 \quad (I),$$

the integers being defined as follows:
x ranges from 0.01 to 0.07,
a ranges from 0.3 to 0.6,
b ranges from zero to 0.35,
c ranges from 0.2 to 0.6,
d ranges from zero to 0.05,
a+b+c+d=1
$M^1$ is at least one metal selected from Ca, Zn, Fe, Ti, Ba, Al,
(b) at least one component of general formula (II)

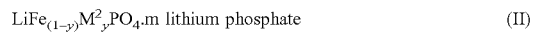

$$LiFe_{(1-y)}M^2_yPO_4 \cdot m \text{ lithium phosphate} \quad (II)$$

y ranges from zero to 0.8
$M^2$ is at least one element selected from Co, Mn, Ni, V, Mg, Nd, Zn, and Y,
m is selected from 0.01 to 0.15, and
(c) electrically conductive carbon.

2. The cathode material according to claim 1, wherein the weight ratio of component (a) to component (b) ranges from 30:70 to 97.5:2.5.

3. The cathode material according to claim 1, wherein the amount of carbon (c) ranges from 2 to 8% by weight, referring to component (b).

4. The cathode material according to claim 1, wherein the surface (BET) of component (b) ranges from 5 to 35 m²/g.

5. The cathode material according to claim 1, wherein
a ranges from 0.32 to 0.50,
b ranges from 0.20 to 0.33,
c ranges from 0.30 to 0.40,
d is zero.

6. The cathode material according to claim 1, wherein lithium phosphate is selected from the group consisting of $Li_3PO_4$, $LiPO_3$ and $Li_4P_2O_7$ or combinations of at least two thereof.

7. The cathode material according to claim 1, wherein component (a) is a gradient material.

8. A cathode comprising the cathode material according to claim 1 and at least one binder (d).

9. A battery comprising:
(A) the cathode according to claim 8,
(B) at least one anode, and
(C) at least one electrolyte.

10. An automobile comprising the battery according to claim 9.

* * * * *